United States Patent
Ono et al.

(10) Patent No.: US 11,277,012 B2
(45) Date of Patent: Mar. 15, 2022

(54) BATTERY CONTROL UNIT AND BATTERY SYSTEM

(71) Applicant: YAZAKI CORPORATION, Tokyo (JP)

(72) Inventors: Chihiro Ono, Susono (JP); Takahiro Syouda, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 147 days.

(21) Appl. No.: 16/808,368

(22) Filed: Mar. 4, 2020

(65) Prior Publication Data

US 2020/0321788 A1 Oct. 8, 2020

(30) Foreign Application Priority Data

Apr. 4, 2019 (JP) .............................. JP2019-072038

(51) Int. Cl.
*H02J 7/00* (2006.01)
*H01M 10/42* (2006.01)

(52) U.S. Cl.
CPC ......... *H02J 7/0019* (2013.01); *H01M 10/425* (2013.01); *H02J 7/0025* (2020.01); *H01M 2010/4271* (2013.01)

(58) Field of Classification Search
USPC ................................. 320/107, 108, 109, 110
See application file for complete search history.

(56) References Cited

U.S. PATENT DOCUMENTS

| 2008/0129225 A1* | 6/2008 | Yamamoto | H02M 3/07 315/307 |
| 2011/0313613 A1 | 12/2011 | Kawahara et al. | |
| 2014/0117975 A1* | 5/2014 | Shimomura | H03K 17/005 324/140 R |
| 2017/0117721 A1 | 4/2017 | Toya | |
| 2020/0321789 A1* | 10/2020 | Ono | H02J 7/0049 |

FOREIGN PATENT DOCUMENTS

| JP | 2002272010 A | * | 9/2002 | |
| JP | 2003087987 A | * | 3/2003 | |
| JP | 2007311335 A | * | 11/2007 | ........ H01M 8/04552 |
| JP | 2008-125158 A | | 5/2008 | |
| JP | 2017-85876 A | | 5/2017 | |
| WO | 2010/109956 A1 | | 9/2010 | |
| WO | WO-2015132891 A1 | * | 9/2015 | ........... G01R 31/396 |

* cited by examiner

*Primary Examiner* — Brian Ngo
(74) *Attorney, Agent, or Firm* — Kenealy Vaidya LLP

(57) ABSTRACT

A plurality of switching units is provided for each of a plurality of batteries. The switching units switch between a connected state where the corresponding battery is connected in series with another battery and a non-connected state where series connection between the corresponding battery and the other battery is disconnected. A control unit controls the switching unit corresponding to the battery to switch to the non-connected state when it is determined that the corresponding battery reaches a charge end voltage during charging or a discharge end voltage during discharging. The control unit changes the charge end voltage such that the charge end voltage of the battery deteriorated is lower than the charge end voltage of the battery not deteriorated, or changes the discharge end voltage such that the discharge end voltage of the battery deteriorated is higher than the discharge end voltage of the battery not deteriorated.

5 Claims, 4 Drawing Sheets

BATTERY CONTROL UNIT AND BATTERY SYSTEM

CROSS-REFERENCE TO RELATED APPLICATIONS

This application is based on and claims priority under 35 USC 119 from Japanese Patent Application No. 2019-072038 filed on Apr. 4, 2019, the contents of which are incorporated herein by reference.

TECHNICAL FIELD

The present invention relates to a battery control unit and a battery system.

BACKGROUND ART

There is a battery system configured by connecting a plurality of batteries in series as a battery mounted on a vehicle to supply electric power to a drive source or to supply electric power to an auxiliary machine. Deterioration of the plurality of batteries varies due to variations of manufacturing or variations of operating environments and so on. For example, a battery near a heat source is rapidly deteriorated, while a battery far from the heat source is slowly deteriorated.

For this reason, the battery that has deteriorated at the time of charging or discharging reaches a charge/discharge end voltage first. In this case, the charging or discharging may have to be stopped even if there is remaining power in the other batteries, thus capacity of the batteries cannot be entirely consumed.

Therefore, it is considered to equalize charging states of the plurality of batteries (Patent Literature 1). However, if all the batteries are set to the same chargedischarge end voltage, a burden of the battery that has deteriorated may increase, thereby resulting in a larger variation of deterioration.

CITATION LIST

Patent Literature

[Patent Literature 1] WO2010/109956

SUMMARY OF INVENTION

The present invention has been made in view of the above circumstances, and an object thereof is to provide a battery control unit and a battery system which can reduce variations of deterioration of a plurality of batteries.

In order to achieve the above object, a battery control unit and a battery system according to the present invention are characterized by the following [1] to [5].

[1]
A battery control unit includes: a switching unit provided for each of a plurality of batteries arranged in series, and configured to switch between a connected state where the corresponding battery is connected in series with the other battery and a non-connected state where series connection between the corresponding battery and the other battery is disconnected; and a control unit configured to control the switching units corresponding to the battery to switch to the non-connected state when it is determined that the corresponding battery reaches a charge end voltage during charging or a discharge end voltage during discharging. The control unit changes the charge end voltage such that the charge end voltage of the battery, which is deteriorated, is lower than the charge end voltage of the batteries which are not deteriorated or changes the discharge end voltage such that the discharge end voltage of the battery, which is deteriorated, is higher than the discharge end voltage of the batteries which are not deteriorated.

[2]
In the battery control unit according to [1], the control unit changes the charge end voltage or the discharge end voltage such that a range between the charge end voltage and the discharge end voltage of the batteries which are deteriorated is narrower than a range between the charge end voltage and the discharge end voltage of the batteries which are not deteriorated.

[3]
In the battery control unit according to [1] or [2], the control unit changes the charge end voltage or the discharge end voltage in accordance with the number of the batteries which are switched to the non-connected state among the plurality of batteries.

[4]
In the battery control unit according to any one of [1] to [3], the control unit changes both the charge end voltage and the discharge end voltage.

[5]
A battery system includes: a plurality of batteries; and the battery control unit according to any one of [1] to [4].

According to the battery control unit and the battery system having the above configurations [1], [2], and [5], a depth of discharge of the deteriorated battery can be reduced to restrain progress of deterioration, thus the variations of deterioration of the plurality of batteries can be restrained.

According to the battery control unit having the above configuration [3], the depth of discharge of the deteriorated battery can be reduced even without detecting deterioration states of the plurality of batteries.

According to the battery control unit having the above configuration [4], by changing both the charge end voltage and the discharge end voltage, a range of variation of the range between the charge end voltage and the discharge end voltage can be increased, the deterioration of the deteriorated battery can be further restrained, and battery capacity of the batteries which are not deteriorated can be more effectively used.

According to the present invention, a battery control unit and a battery system, which can reduce the depth of discharge of the deteriorated battery to restrain the variation of deterioration of the plurality of batteries, can be provided.

The present invention has been briefly described above. Details of the present invention are further clarified by reading a mode for carrying out the present invention described below (hereinafter, referred to as "embodiment") with reference to the accompanying drawings.

DESCRIPTION OF EMBODIMENTS

A specific embodiment of the present invention will be described below with reference to the drawings.

Figure 1:
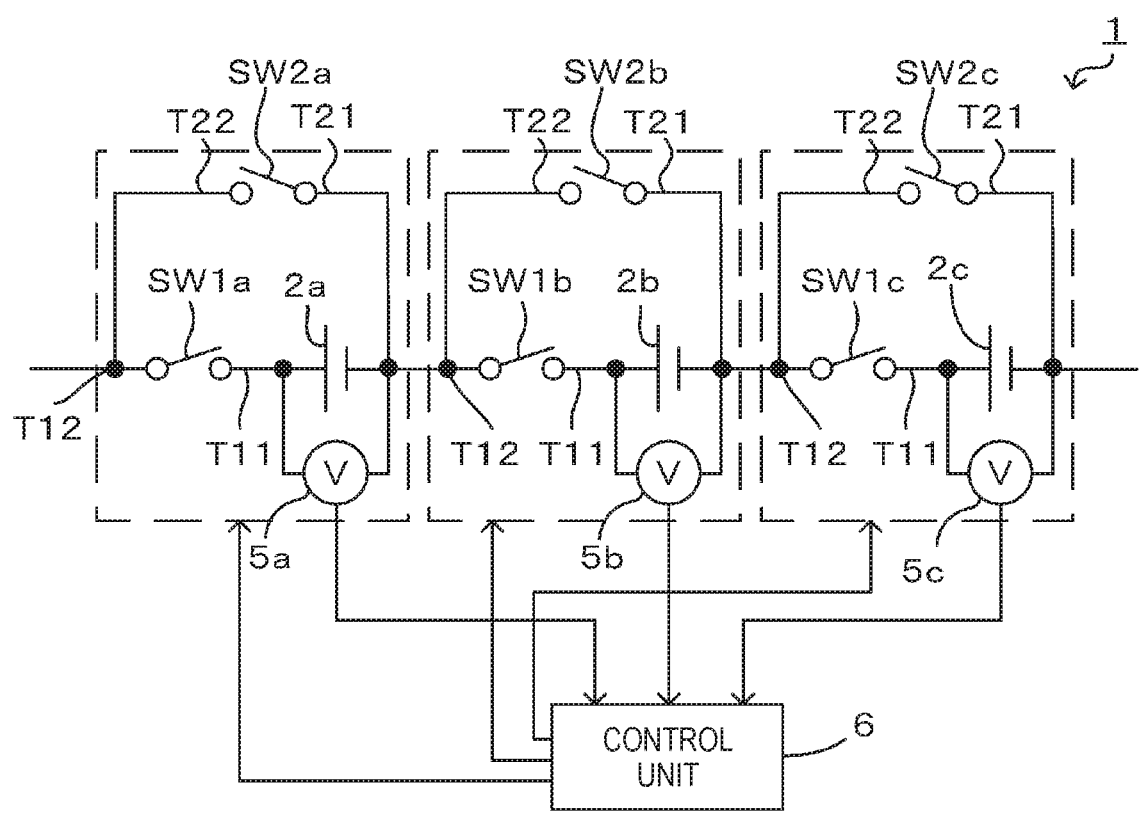
FIG. 1 is a circuit diagram showing a battery system according to the present invention.

A battery system shown in FIG. 1 is mounted on, for example, an EV or HEV vehicle that is driven by an electric motor and provides power source for the electric motor.

As shown in FIG. 1, a battery system 1 includes a plurality of batteries 2a to 2c and a battery control unit 3. Although an example in which the three batteries 2a to 2c are connected in series will be described in the present embodiment to simplify the description, the present invention is not limited thereto. The number of the batteries 2a to 2c may be two, or four or more as long as the number is plural. Each of the plurality of batteries 2a to 2c is a chargeable and dischargeable storage battery, and may be configured by one cell, or may be configured by a plurality of cells.

The battery control unit 3 includes a plurality of switching units 4a to 4c, a plurality of voltage measuring units 5a to 5c, and a control unit 6. The plurality of switching units 4a to 4c are provided corresponding to the plurality of batteries 2a to 2c, respectively. The plurality of switching units 4a to 4c have the same configuration.

The switching units 4a to 4c is able to switch between a connected state where the corresponding batteries 2a to 2c are connected in series to the other batteries 2a to 2c and a non-connected state where series connection between the corresponding batteries 2a to 2c and the other batteries 2a to 2c are disconnected. More specifically, the batteries 2a to 2c which are switched to the connected state by the switching units 4a to 4c are connected in series and used as a power source. On the other hand, the batteries 2a to 2c which are switched to the non-connected state by the switching units 4a to 4c are disconnected from the batteries 2a to 2c in the connected state and are not used as the power source.

The switching unit 4a includes a first switch SW1a which is connected in series to the battery 2a, and a second switch SW2a which is connected in parallel to the battery 2a and the first switch SW1a. One end T11 of the first switch SW1a is connected to one pole (for example, a positive pole) of the battery 2a. One end T21 of the second switch SW2a is connected to the other pole (for example, a negative pole) of the battery 2a, while the other end T22 thereof is connected to the other end T12 of the first switch SW1a. The switching units 4b, 4c can be described by replacing "a" in the above description of the switching unit 4a with "b" and "c", respectively, thus a detailed description thereof is omitted.

The other end T12 of the first switch SW1b is connected to a negative pole of the battery 2a, while the other end T12 of the first switch SW1c is connected to the negative pole of the battery 2b. That is, the first switches SW1b, SW1c are respectively connected between the adjacent batteries 2a and 2b and between the adjacent batteries 2b and 2c.

According to the above configuration, when the second switches SW2a to SW2c are turned off while the first switches SW1a to SW1c are turned on, the corresponding batteries 2a to 2c are in the connected state. When the first switches SW1a to SW1c are turned off, the corresponding batteries 2a to 2c are in the non-connected state. At this time, when the second switches SW2a to SW2c are turned on, a bypass path is formed, and only the batteries 2a to 2c which are in the connected state are connected in series.

The voltage measuring units 5a to 5c measure voltages at two ends of the corresponding batteries 2a to 2c and output measurement results thereof to the control unit 6 described below.

The control unit 6 is configured by known CPU, ROM, and RAM, and controls the entire battery system 1. The control unit 6 controls ON and OFF of the first switches SW1a to SW1c and the second switches SW2a to SW2c based on the voltages at the two ends of the batteries 2a to 2c.

Figure 2:
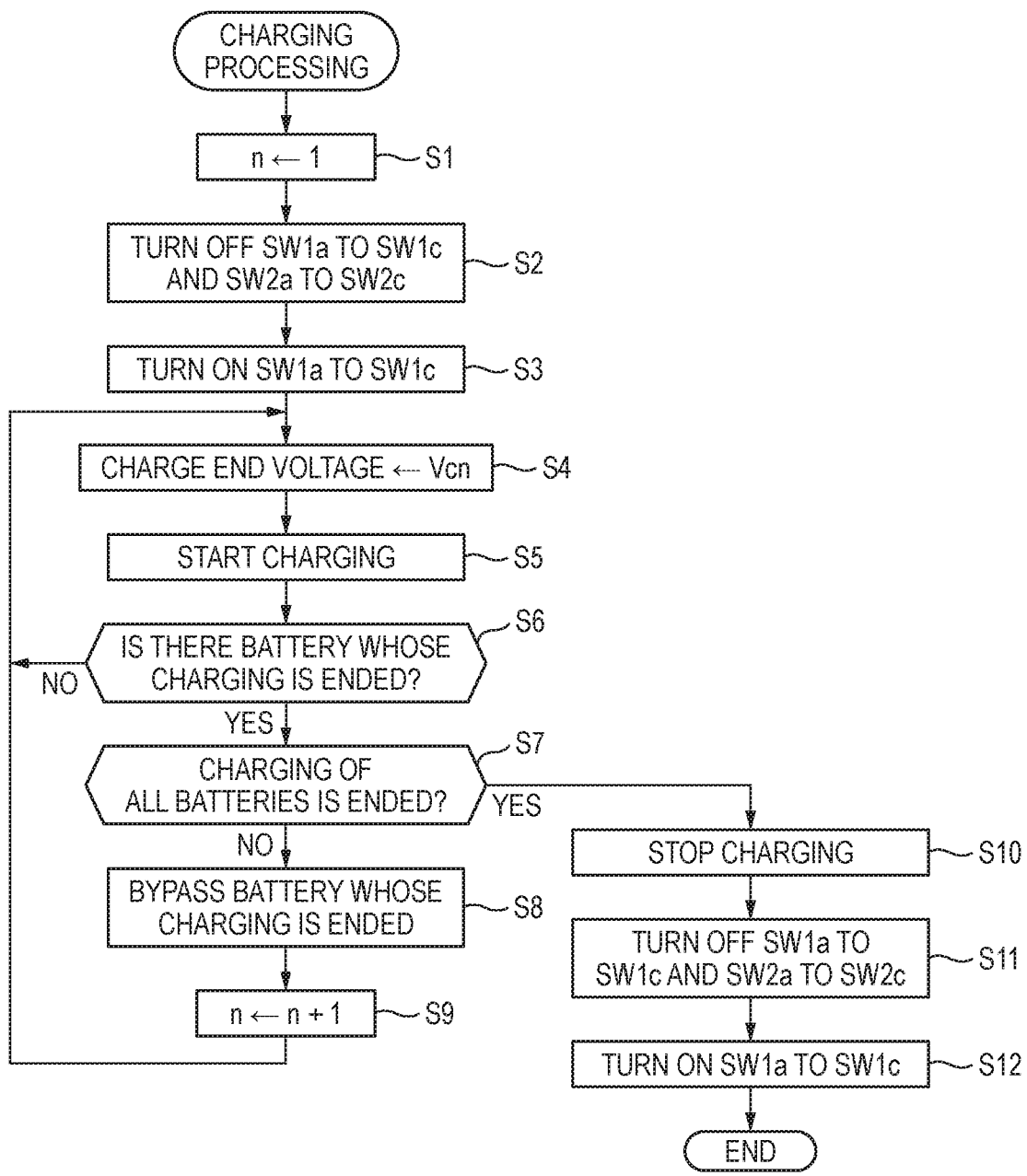
FIG. 2 is a flowchart showing a charging processing procedure of a control unit shown in FIG. 1.

Next, a charging operation of the battery system 1 configured as described above will be described with reference to FIGS. 2 and 4A-4D. FIG. 2 is a flowchart showing a charging processing procedure of the control unit 6 shown in FIG. 1. FIGS. 4A to 4D are explanatory diagrams which describe the charging processing procedure and a discharging processing procedure of the control unit 6 shown in FIG. 1.

Upon receiving a charging command, the control unit 6 starts charging processing shown in FIG. 2. First, the control unit 6 sets a variable n, which is used for counting the number of bypasses of the batteries 2a to 2c, to 1 (initial value) (step S1).

Figure 4A:
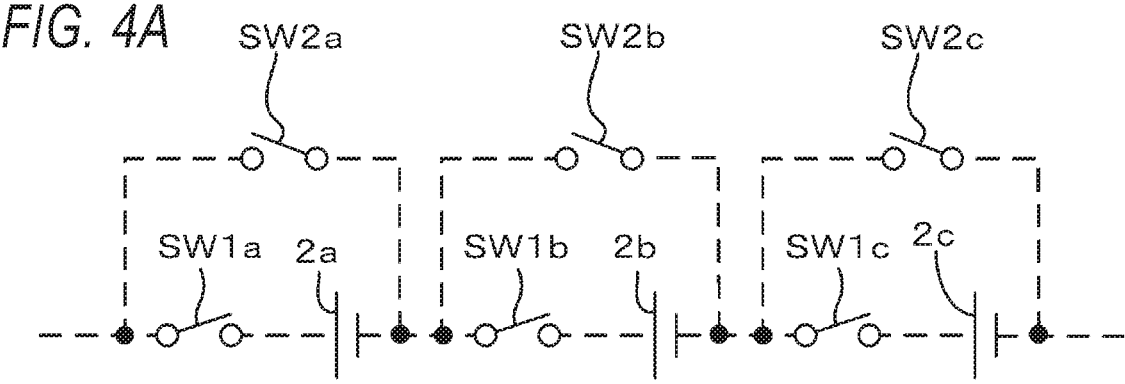
FIGS. 4A to 4D are explanatory diagrams which describe the charging processing procedure and the discharging processing procedure of the control unit shown in FIG. 1.
Figure 4B:
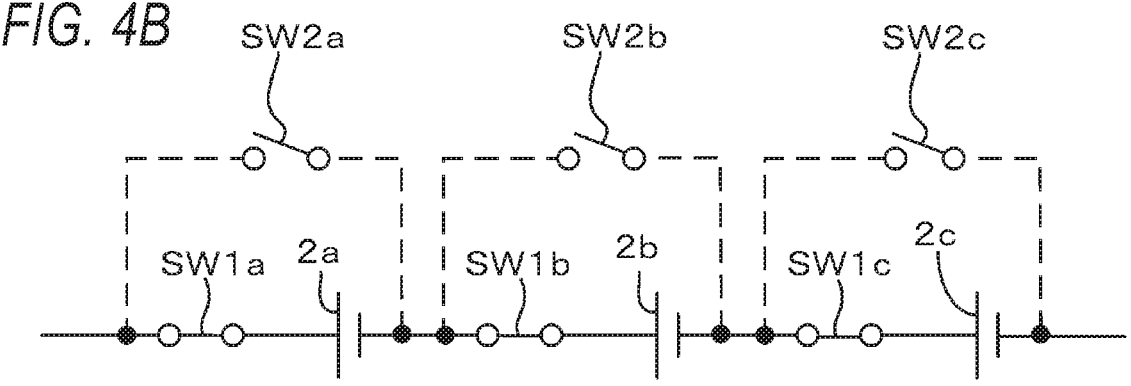
Figure 4C:
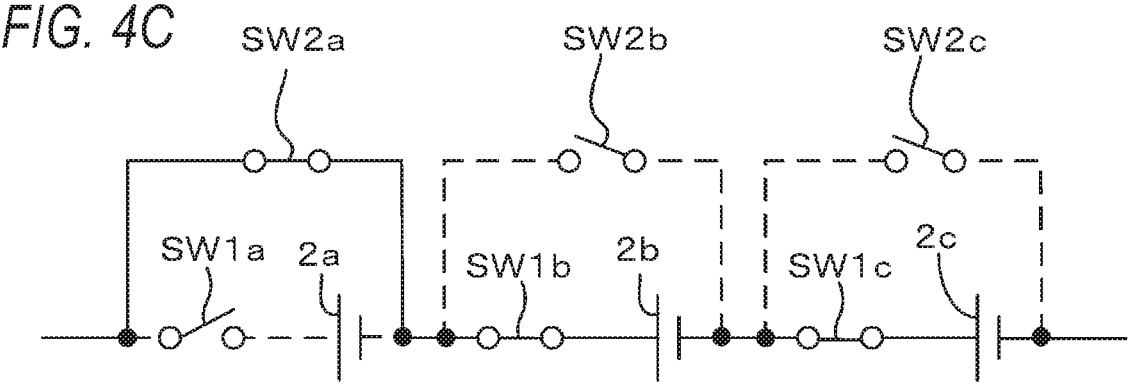
Figure 4D:
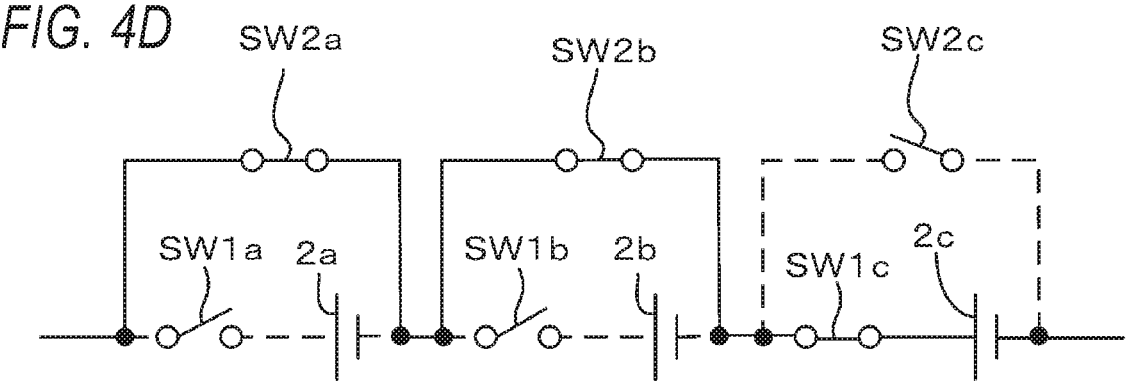

Next, as shown in FIG. 4A, the control unit 6 turns off all the first switches SW1a to SW1c and all the second switches SW2a to SW2c (step S2). Thereafter, as shown in FIG. 4B, the control unit 6 turns on all the first switches SW1a to SW1c (step S3), and connects all the batteries 2a to 2c in series. Next, the control unit 6 sets a charge end voltage to a set value Vcn corresponding to the variable n (step S4).

In the present embodiment, when n=1 (the number of bypasses is 0), the control unit 6 sets the charge end voltage to a set value Vc1=4.0V. The control unit 6 changes the charge end voltage, which is increased by 0.1 V each time the number of bypasses increases. That is, when n=2, the charge end voltage is changed to a set value Vc2=4.1V, and when n=3, the charge end voltage is changed to a set value Vc3=4.2V.

Thereafter, the control unit 6 starts charging the batteries 2a to 2c (step S5). Next, the control unit 6 acquires the voltages at the two ends of the batteries 2a to 2c measured by the voltage measuring units 5a to 5c and compares the acquired voltages with the charge end voltage set in step S4 (step S6). As a result of the comparison, if no battery 2a to 2c reaches the charge end voltage among the batteries 2a to 2c in the connected state (N in step S6), the control unit 6 returns to step S4.

On the other hand, if there is a battery 2a to 2c that has reached the charge end voltage set in step S4 (Y in step S6), the control unit 6 determines whether all the batteries 2a to 2c have reached the charge end voltage (step S7). If not all of the batteries 2a to 2c have reached the charge end voltage (N in step S7), the control unit 6 bypasses the batteries 2a to 2c which are determined to have reached the charge end voltage in step S6 (step S8).

More specifically, in step S8, the control unit 6 turns off the first switches SW1a to SW1c corresponding to the batteries 2a to 2c which have reached the charge end voltage, and turns on the second switches SW2a to SW2c corresponding to the batteries 2a to 2c which have reached the charge end voltage. As a result, the batteries 2a to 2c which are determined to have reached the charge end voltage are in the non-connected state. Thereafter, the control unit 6 increments n (step S9), and returns to step S4.

On the other hand, when it is determined that all the batteries 2a to 2c have reached the charge end voltage (Y in step S7), the control unit 6 stops the charging (step S10). Thereafter, the control unit 6 turns off all the first switches SW1a to SWc and all the second switches SW2a to SW2c (step S11), then turns on all the first switches SW1a to SW1c (step S11), and ends the processing.

A rate of increase of the voltages at the two ends during charging is higher for the batteries 2a to 2c which are deteriorated, and the charge end voltage thereof is reached soon even if the batteries 2a to 2c are charged with the same current. For example, when the batteries are deteriorated in an order of 2c, 2b, 2a, the most deteriorated battery 2a reaches the charge end voltage Vc1=4.0V first. Therefore, according to the above-described operation, the control unit 6 first turns off the first switch SWa corresponding to the battery 2a, turns on the second switch SW2a (FIG. 4C), and bypasses the battery 2a.

Thereafter, the control unit 6 changes the charge end voltage to the Vc2=4.1V. Next, the second deteriorated battery 2b reaches the charge end voltage Vc2=4.1 V earlier than the battery 2c. Therefore, according to the above-described operation, the control unit 6 turns off the first switch SW1b corresponding to the battery 2b next, turns on the second switch SW2b (FIG. 4D), and bypasses the battery 2b.

Thereafter, the control unit 6 changes the charge end voltage to the Vc3=4.2V. Next, the battery 2c which is the least deteriorated reaches the charge end voltage Vc3=4.2 V. According to the above-described operation, the control unit 6 turns off all the switches SW1a to SW1c, SW2a to SW2c (FIG. 4A), and stops the charging.

Figure 3:
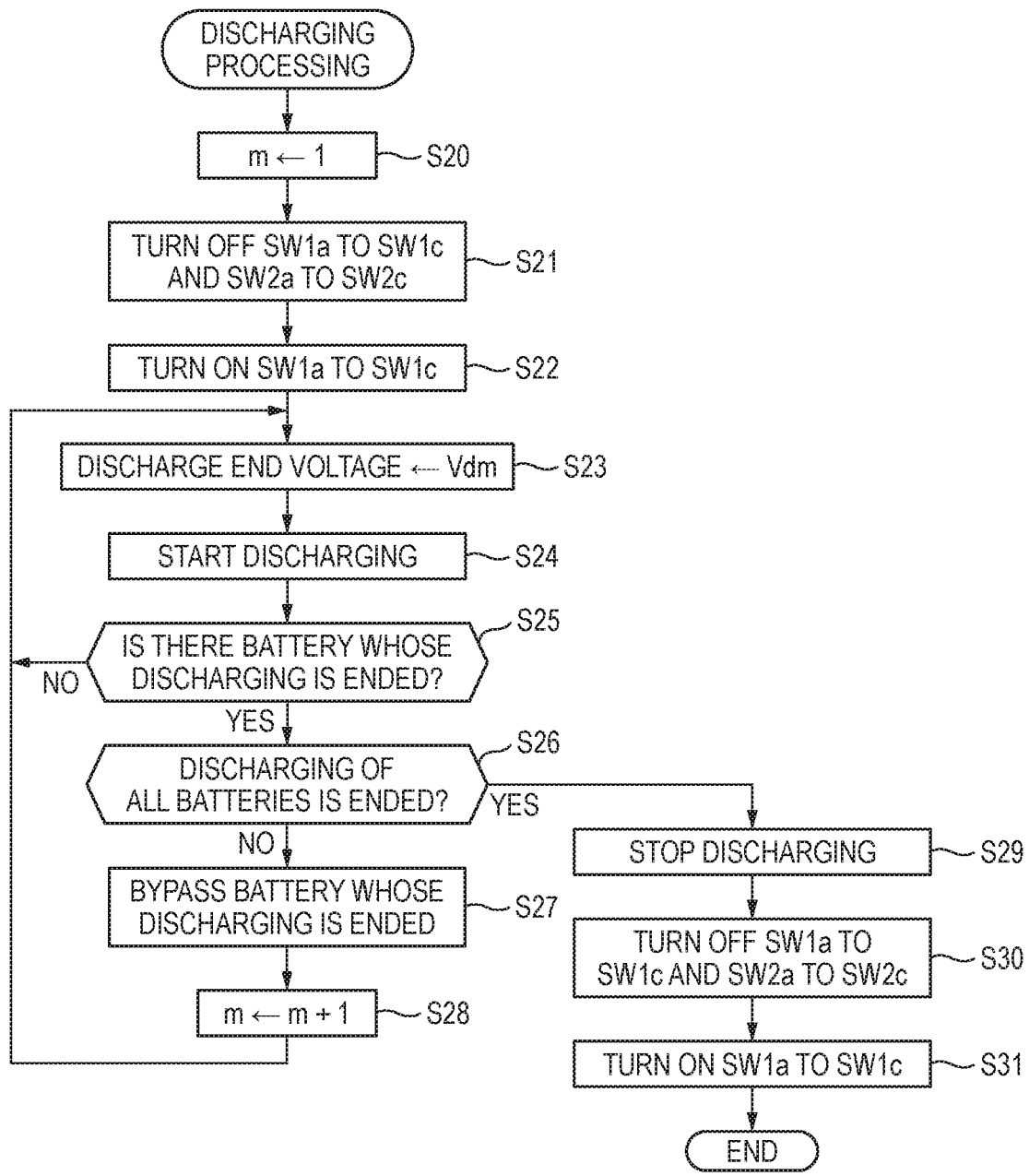
FIG. 3 is a flowchart showing a discharge processing procedure of the control unit shown in FIG. 1.

Next, a discharging operation of the battery system 1 configured as described above will be described with reference to FIGS. 3 and 4. FIG. 3 is a flowchart showing a discharge processing procedure of the control unit 6 shown in FIG. 1.

Upon receiving a discharging command, the control unit 6 starts discharging processing shown in FIG. 3. First, the control unit 6 sets a variable m, which is used for counting the number of bypasses of the batteries 2a to 2c, to 1 (initial value) (step S20).

Next, as shown in FIG. 4A, the control unit 6 turns off all the first switches SW1a to SW1c and all the second switches SW2a to SW2c (step S21). Thereafter, as shown in FIG. 4B, the control unit 6 turns on all the first switches SW1a to SW1c (step S22), and connects all the batteries 2a to 2c in series. Next, the control unit 6 sets a discharge end voltage to a set value Vdm corresponding to the variable m (step S23).

In the present embodiment, when m=1 (the number of bypasses is 0), the control unit 6 sets the discharge end voltage to a set value Vd1=2.8V. The control unit 6 changes the discharge end voltage, which is decreased by 0.1 V each time the number of bypasses increases. That is, when m=2, the discharge end voltage is changed to a set value Vd2=2.7 V and when m=3, the discharge end voltage is changed to a set value Vd3=2.6V.

Thereafter, the control unit 6 starts discharging the batteries 2a to 2c (step S24). Next, the control unit 6 acquires the voltages at the two ends of the batteries 2a to 2c measured by the voltage measuring units 5a to 5c and compares the acquired voltages with the discharge end voltage set in step S23 (step S25). As a result of the comparison, if no battery 2a to 2c reaches the discharge end voltage among the batteries 2a to 2c in the connected state (N in step S25), the control unit 6 returns to step S23.

On the other hand, if there is a battery 2a to 2c that has reached the discharge end voltage set in step S23 (Y in step S25), the control unit 6 determines whether all the batteries 2a to 2c have reached the discharge end voltage (step S26). If not all of the batteries 2a to 2c have reached the discharge end voltage (N in step S26), the control unit 6 bypasses the batteries 2a to 2c, which are determined to have reached the discharge end voltage in step S25 (step S27).

More specifically, in step S27, the control unit 6 turns off the first switches SW1a to SW1c corresponding to the batteries 2a to 2c which have reached the discharge end voltage, and turns on the second switches SW2a to 2c corresponding to the voltages 2a to 2c which have reached the discharge end voltage. As a result, the batteries 2a to 2c which are determined to have reached the discharge end voltage are in the non-connected state. Thereafter, the control unit 6 increments m (step S28), and returns to step S23.

On the other hand, when it is determined that all the batteries 2a to 2c reach the discharge end voltage (Y in step S26), the control unit 6 stops the discharging (step S29). Thereafter, the control unit 6 turns off all the first switches SW1a to SW1c and all the second switches SW2a to SW2c (step S30), then turns on all the first switches SW1a to SW1c (step S31), and ends the processing.

A rate of decrease of the voltages at the two ends during discharging is higher for the batteries 2a to 2c which are deteriorated, and the discharge end voltage thereof is reached soon even if the batteries 2a to 2c are discharged with the same current. For example, when the batteries are deteriorated in an order of 2c, 2b, 2a, the most deteriorated battery 2a reaches the discharge end voltage Vd1=2.8V first. Therefore, according to the above-described operation, the control unit 6 first turns off the first switch SW1a corresponding to the battery 2a, turns on the second switch SW2a (FIG. 4C), and bypasses the battery 2a.

Thereafter, the control unit 6 changes the discharge end voltage to the Vd2=2.7V. Next, the second deteriorated battery 2b reaches the discharge end voltage Vd2=2.7V earlier than the battery 2c. Therefore, according to the above-described operation, the control unit 6 turns off the first switch SW1b corresponding to the battery 2b next, turns on the second switch SW2b (FIG. 4D), and bypasses the battery 2b.

Thereafter, the control unit 6 changes the discharge end voltage to the Vd3=2.6V. Next, the battery 2c which is the least deteriorated reaches the discharge end voltage Vd3=2.6V. According to the above-described operation, the control unit 6 turns off all the switches SW1a to SW1c, SW2a to SW2c (FIG. 4A), and stops the charging.

Although the deterioration of the batteries 2a to 2c can be restrained as the charge end voltage is set to be low, since a depth of discharge (DOD) becomes shallow, capacity of the batteries cannot be entirely consumed. On the other hand, although the deterioration of the batteries 2a to 2c cannot be restrained as the charge end voltage is set to be high, since the DOD becomes deep, the capacity of the batteries can be entirely consumed. According to the embodiment described above, the control unit 6 changes the charge end voltage such that the charge end voltage for the batteries 2a to 2c which are deteriorated becomes lower.

As a result, the DOD of the batteries 2a to 2c which are deteriorated can be reduced to restrain the deterioration, thus variations of deterioration of the plurality of batteries 2a to 2c can be restrained. The batteries 2a to 2c which are not deteriorated have a deeper DOD, so that the capacity of the batteries can be effectively consumed.

Although the deterioration of the batteries 2a to 2c can be restrained as the discharge end voltage is set to be high, since the DOD becomes shallow, the capacity of the batteries cannot be entirely consumed. On the other hand, although the deterioration of the batteries 2a to 2c cannot be restrained as the discharge end voltage is set to be low, since the DOD becomes deep, the capacity of the batteries can be entirely consumed. According to the embodiment described above, the control unit 6 changes the discharge end voltage such that the discharge end voltage for the batteries 2a to 2c which are deteriorated becomes higher.

As a result, as in the case of charging, the DOD of the batteries 2a to 2c which are deteriorated can be reduced to restrain the deterioration, thus the variations of deterioration of the plurality of batteries 2a to 2c can be restrained. The batteries 2a to 2c which are not deteriorated have a deeper DOD, so that the capacity of the batteries can be effectively consumed.

According to the embodiment described above, the control unit 6 changes both the charge end voltage and the discharge end voltage. As a result, a range of variation of a range between the charge end voltage and the discharge end voltage can be increased, the deterioration of the batteries 2a to 2c which are deteriorated can be further restrained, and the battery capacity of the batteries which are not deteriorated can be more effectively used.

According to the embodiment described above, the control unit 6 changes the charge end voltage and the discharge end voltage in accordance with the number (bypass number) of the batteries 2a to 2c which are switched to the non-connected state among the plurality of batteries 2a to 2c. As a result, the DOD of the batteries 2a to 2c which are deteriorated can be reduced even without detecting deterioration states of the plurality of batteries 2a to 2c.

The present invention is not limited to the above-described embodiment and may be appropriately modified, improved, or the like. Materials, shapes, sizes, numbers, arrangement positions, and the like of constituent elements in the embodiment described above are optional as long as the present invention can be achieved, and the present invention is not limited thereto.

Although the control unit 6 changes both the charge end voltage and the discharge end voltage according to the embodiment described above, the present invention is not limited thereto. The control unit 6 may change only one of the charge end voltage or the discharge end voltage.

Although the control unit 6 differentiates the charge end voltage or the discharge end voltage of all of the plurality of batteries 2a to 2c according to the embodiment described above, the present invention is not limited thereto. The charge end voltage or the discharge end voltage of all the batteries 2a to 2c is not necessarily different. For example, the charge end voltage or the discharge end voltage of the most deteriorated battery 2a may be set to be lower or higher than the charge end voltage or the discharge end voltage of the other batteries 2b, 2c (batteries which are not deteriorated).

Specifically, when the number of bypasses of the batteries 2a to 2c is 1 (n=1) as in the embodiment described above, the control unit 6 may set the charge end voltage to 4.0V and the discharge end voltage to 2.8V, and set the charge end voltage to 4.2V and the discharge end voltage to 2.6V when the number of bypasses of the batteries 2a to 2c is 2 to 3.

Although the switching units 4a to 4c include the first switches SW a to SW1c and the second switches SW2a to SW2c according to the embodiment described above, the present invention is not limited thereto. The switching units 4a to 4c may include a switching switch that selects one of the batteries 2a to 2c or a bypass circuit connected in parallel to the batteries 2a to 2c.

Characteristics of the battery control unit and the battery system according to the present invention are briefly summarized in the following [1] to [5].

[1]

A battery control unit (3) includes: switching units (4a to 4c) provided for each of a plurality of batteries (2a to 2c) arranged in series, and configured to switch between a connected state where the corresponding batteries (2a to 2c) are connected in series with the other batteries (2a to 2c) and a non-connected state where series connection between the corresponding batteries (2a to 2c) and the other batteries (2a to 2c) are disconnected; and a control unit (6) configured to control the switching units (4a to 4c) corresponding to the batteries (2a to 2c) to switch to the non-connected state when it is determined that the corresponding batteries (2a to 2c) reach a charge end voltage during charging or a discharge end voltage during discharging. The control unit (6) changes the charge end voltage such that the charge end voltage of the batteries (2a to 2c), which are deteriorated, is lower than the charge end voltage of the batteries (2a to 2c) which are not deteriorated or changes the discharge end voltage such that the discharge end voltage of the batteries (2a to 2c), which are deteriorated, is higher than the discharge end voltage of the batteries (2a to 2c) which are not deteriorated.

[2]

In the battery control unit (3) according to [1], the control unit (6) changes the charge end voltage or the discharge end voltage such that a range between the charge end voltage and the discharge end voltage of the batteries (2a to 2c) which are deteriorated is narrower than a range between the charge end voltage and the discharge end voltage of the batteries (2a to 2c) which are not deteriorated.

[3]

In the battery control unit (3) according to [1] or [2], the control unit (6) changes the charge end voltage or the discharge end voltage in accordance with the number of the batteries (2a to 2c) which are switched to the non-connected state among the plurality of batteries (2a to 2c).

[4]

In the battery control unit (3) according to any one of [1] to [3], the control unit (6) changes both the charge end voltage and the discharge end voltage.

[5]

A battery system (1) includes: a plurality of batteries (2a to 2c); and the battery control unit (3) according to any one of [1] to [4].

What is claimed is:

1. A battery control unit comprising:
    a switching unit provided for each of a plurality of batteries arranged in series, and configured to switch between a connected state where the corresponding battery is connected in series with another battery and a non-connected state where series connection between the corresponding battery and the other battery is disconnected; and
    a control unit configured to control the switching unit corresponding to the battery to switch to the non-connected state so as to bypass the corresponding battery when it is determined that the corresponding battery reaches a charge end voltage during charging or a discharge end voltage during discharging,
    wherein the control unit changes the charge end voltage such that the charge end voltage of the battery, which is deteriorated, is lower than the charge end voltage of the battery which is not deteriorated, or changes the discharge end voltage such that the discharge end voltage of the battery, which is deteriorated, is higher than the discharge end voltage of the battery which is not deteriorated.

2. The battery control unit according to claim 1, wherein the control unit changes the charge end voltage or the discharge end voltage such that a range between the charge end voltage and the discharge end voltage of the batteries which are deteriorated is narrower than a range between the charge end voltage and the discharge end voltage of the batteries which are not deteriorated.

3. The battery control unit according to claim 1, wherein the control unit changes the charge end voltage or the discharge end voltage in accordance with a number of the battery which are switched to the non-connected state among the plurality of batteries.

4. The battery control unit according to claim 1, wherein the control unit changes both the charge end voltage and the discharge end voltage.

5. A battery system comprising:
a plurality of batteries; and
the battery control unit according to claim 1.

* * * * *